Nov. 9, 1937.  J. V. SCHAFER  2,098,693
LEVEL WIND MECHANISM FOR FISHING REELS
Filed Aug. 16, 1935   2 Sheets—Sheet 1

Inventor:
John V Schafer
By Freeman, Sweet, Albrecht & Weidman
Attorneys

Nov. 9, 1937.  J. V. SCHAFER  2,098,693
LEVEL WIND MECHANISM FOR FISHING REELS
Filed Aug. 16, 1935   2 Sheets-Sheet 2
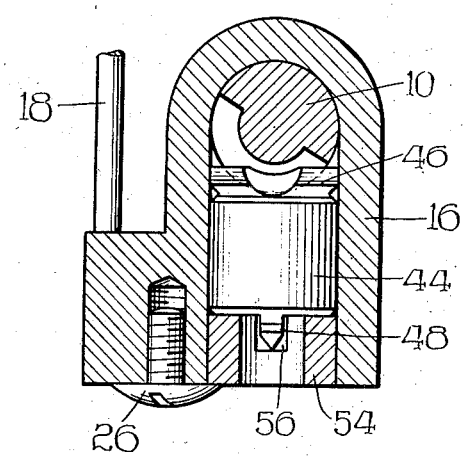
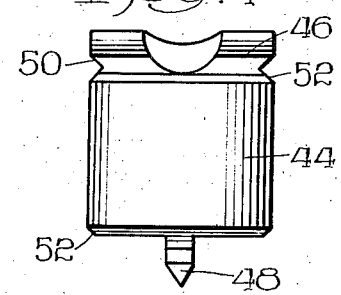
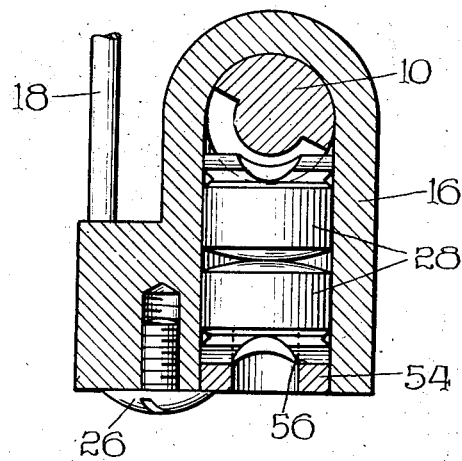
Inventor:
John V. Schafer
By Freeman, Sweet, Albrecht & Wadwa
Attorneys Patented Nov. 9, 1937

2,098,693

UNITED STATES PATENT OFFICE 2,098,693

LEVEL WIND MECHANISM FOR FISHING REELS

John V. Schafer, Bronson, Mich., assignor to Bronson Reel Company, Bronson, Mich., a corporation of Michigan Application August 16, 1935, Serial No. 36,514

13 Claims. (Cl. 242—84.4)

My invention relates to fishing reels and includes among its objects and advantages an improvement in the durability and reliability of the level wind mechanism for a fishing reel.

In the accompanying drawings:

Figure 5 is a section of a carriage employing a double-bladed pawl with a special retaining ring;

Figure 3:
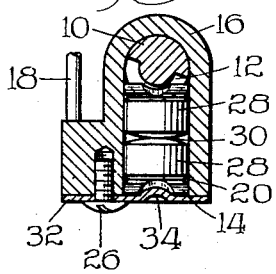
Figures 3 and 4 are sections similar to Figure 2 indicating modified pawl constructions.

Figure 6 indicates the use of such a retaining ring with a combination of pawls according to Figure 3; and Figure 7 is an elevation of the pawl itself as in Figure 5.

Figure 1:
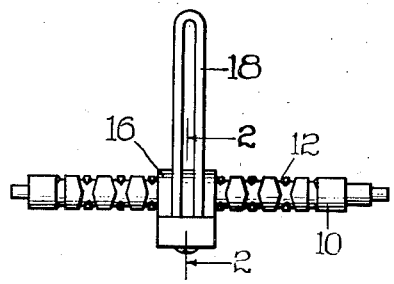
Figure 1 is an elevation of the level wind shaft and associated parts of a fishing reel.
Figure 2:
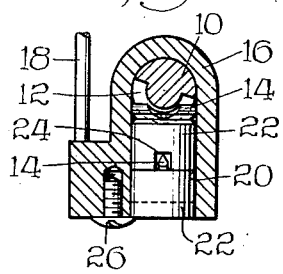
Figure 2 is a section on line 2—2 of Figure 1.

In the embodiment of the invention selected for illustration, the drive shaft 10 has the usual feed threads 12 adapted for engagement by a blade 14 to move the carriage 16 to and fro on the shaft. The carriage 16 has been illustrated as sliding directly on the shaft 10, and provided with the line guiding loop 18. The carriage is provided with a bore 20 open at its bottom to receive the pawl and support it in driving engagement with the threads 12 but pivoted to turn about its own axis, which is perpendicular to the shaft axis. In Figure 2 the bore 20 accommodates two identical pawls 22. Each pawl 22 carries a blade 14 at its upper end, and at its lower end is provided with a transverse slot 24 to receive the blade of the pawl below it. The length of the bore 20 is equal to the total length of all the pawls, and a retaining screw 26 engages the exposed butt of the lowest pawl to hold the entire assembly in place. When the upper blade 14 has seen an extended period of service and become so worn that it needs replacement, it is only necessary to take the pawls out and interchange them to have a brand new blade.

Referring now to Figure 3, the pawl 28 is identical with the pawl 22 except that it has a convex butt at 30. The two pawls 28 are identical and are put in the bore 20, butt to butt. The retaining plate 32 has a central boss or button 34 that makes contact with the concave end surface of the adjacent blade 14 to hold the pawls axially in place. The pawls of Figure 3 may be interchanged in an obvious manner to achieve the same result as with the pawls of Figure 2.

Figure 4:
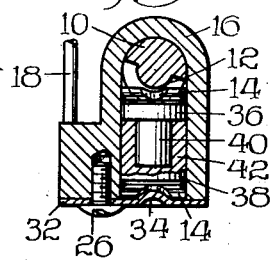

Referring now to Figure 4, the pawls 36 and 38 are both assembled in the bore 20 but they are not identical. They have identical blades 14, but just back of the blade the pawl 36 is cut down to a smaller diameter leaving a central stud 40. The pawl 38 is counterbored to receive the central stud 40, leaving the sleeve 42 of the pawl 38 receiving the stud.

It is not difficult to fit the parts with sufficient accuracy so that the assembly of Figure 4 provides each blade 14 with mechanical support equivalent to that obtained with a single integral pawl extending throughout the length of the bore 20. Using an assembly as in Figure 4, it is advantageous to have the blade of the pawl 36 of a size and shape for the best action on the threads 12 when the reel is new and to form the blade of the pawl 38 in a different die and a few thousandths of an inch larger. Thus when the upper blade has become worn, the wear on the threads 12 will have enlarged them a trifle, and the slightly larger blade on the pawl 38 will give better service throughout the second period of use than it would if it were the same size as the original blade.

In Figure 5 the pawl 44 is provided with blades 46 and 48 at opposite ends lying in planes at right angles to each other. Before the milling and stamping operations that finish the shape of the blades 46 and 48, the blank is turned to form an annular groove 50 near both ends. The subsequent removal of additional material to shape the blade removes most of the groove, leaving only a slight cone at 52 amounting to a beveled edge at each end of the cylindrical body portion of the pawl. The presence of the groove substantially eliminates the formation of burrs during the machining of the blades, at points where the removal of such burrs would be difficult and leaving them in place would entail a risk of scoring the bore receiving the pawl. Thus, a slight burr at the point where the cone 52 merges into the notched end of the blade 46 is still within the contour of the cylinder 44, and whether or not it is removed becomes immaterial.

The pawl of Figure 5 is held in place by the annular retainer 54, notched at 56 to receive the adjacent blade 48, and the same fastening screw 26 may overlie the retainer 54. This affords the user, when reassembling the reel, an opportunity to look and see that the pawl is properly placed, thereby obviating the danger of tightening the set screw 26 when the blade 46 is not properly entered in the threads of the drive shaft 10. It also provides a very convenient pocket in which the user can place a drop of oil now and then, and by turning the shaft 10 a few revolutions, work the oil down and around the pawl and into the threads 12 for complete and thorough lubrication of all the moving parts involved.

In Figure 6 I have indicated the same retaining ring 54 assembled with the pawls 28 of Figure 3. It will be obvious that the pawls of Figure 4 are also adapted to be supported by the ring 54.

Without further elaboration the foregoing will so fully explain my invention that others may, by applying knowledge current at the time of application, readily adapt the same for use under various conditions of service.

I claim:

1. A level wind drive mechanism for fishing reels comprising, in combination: a threaded shaft; a carriage slidable parallel to the shaft axis and bearing directly on the shaft, said carriage having a transverse bore adapted to house pawl means; pawl means including a plurality of separate pawls of different configuration, each pawl having a thread-engaging blade, one of said blades being shaped to fit the threads on a new shaft, and another of said blades being shaped to fit the threads on a worn shaft; each pawl having a cylindrical portion fitting said bore, and another portion shaped to engage another pawl; retaining means engaging the pawl farthest from the shaft to prevent movement of all the pawls radially away from the shaft axis; and line guiding means mounted on said carriage.

2. A level wind drive mechanism for fishing reels comprising, in combination: a threaded shaft; a carriage slidable parallel to the shaft axis, said carriage having a transverse bore adapted to house pawl means; and pawl means in said bore including a plurality of separate pawls, each pawl having a thread-engaging blade, one of said blades being shaped to fit the threads on a new shaft, and another of said blades being shaped to fit the threads on a worn shaft.

3. A level wind drive mechanism for fishing reels comprising, in combination: a threaded shaft; a carriage slidable parallel to the shaft axis, said carriage having a transverse bore adapted to house pawl means; pawl means including a plurality of separate pawls of different configuration, each pawl having a thread-engaging blade, one of said blades being shaped to fit the threads on a new shaft, and another of said blades being shaped to fit the threads on a worn shaft; each pawl having a cylindrical portion fitting said bore, and another portion shaped to engage another pawl; and retaining means engaging the pawl farthest from the shaft to prevent movement of all the pawls radially away from the shaft axis.

4. A level wind drive mechanism for fishing reels comprising, in combination: a threaded shaft; a carriage slidable parallel to the shaft axis, said carriage having a transverse bore adapted to house pawl means; pawl means including a plurality of separate pawls of different configuration, each pawl having a thread-engaging blade, one of said blades being shaped to fit the threads on a new shaft, and another of said blades being shaped to fit the threads on a worn shaft; each pawl having a cylindrical portion fitting said bore, and another portion shaped to engage another pawl; one of said pawls having a reduced shank and another pawl having a central bore receiving said shank; retaining means engaging the pawl farthest from the shaft to prevent movement of all the pawls radially away from the shaft axis.

5. A level wind drive mechanism for fishing reels comprising, in combination: a threaded shaft; a carriage slidable parallel to the shaft axis, said carriage having a transverse bore adapted to house pawl means; pawl means including a plurality of separate pawls, each pawl having a thread-engaging blade, and each pawl having a slotted butt adapted to receive the blade of another pawl; and retaining means engaging the butt of the pawl farthest from the shaft.

6. A level wind mechanism for fishing reels comprising, in combination: a threaded shaft; a carriage slidable parallel to the shaft axis and bearing directly on the shaft, said carriage having a transverse bore adapted to house pawl means; pawl means including, when assembled, a plurality of blades projecting in opposite directions; a pawl retainer housed in the same bore with said pawl means and comprising an annular ring, said retainer defining a central aperture available for inspection or injection of lubricant, said retainer having peripheral notches receiving the adjacent pawl blade; and removable stationary fastening means extending at least partly across said bore below said retainer to hold all the parts in assembled relation.

7. A level wind mechanism for fishing reels comprising, in combination: a threaded shaft; a carriage slidable parallel to the shaft axis, said carriage having a transverse bore adapted to house pawl means; pawl means including, when assembled, a plurality of blades projecting in opposite directions; a pawl retainer housed in the same bore with said pawl means and comprising an annular ring, said retainer defining a central aperture available for inspection or injection of lubricant, said retainer having peripheral notches receiving the adjacent pawl blades; and removable stationary fastening means extending at least partly across said bore below said retainer to hold all the parts in assembled relation.

8. A level wind mechanism for fishing reels, comprising, in combination: a threaded shaft; a carriage slidable on said shaft parallel to the shaft axis, said carriage having a transverse bore adapted to house pawl means; a plurality of pawls in said bore; the innermost pawl having a blade engaging said shaft; a retaining member engaging the outermost pawl; said pawls abutting each other whereby said retaining member holds them all in position.

9. A level wind mechanism for fishing reels comprising, in combination: a threaded shaft; a carriage slidably supported by said shaft and movable parallel to the shaft axis; a plurality of separate pawl members; said carriage being shaped to house all said pawl members with one pawl member only in operative engagement with said shaft; and retaining means for said pawls, removable to permit interchanging said pawls, said inactive pawl being positioned between the active pawl and said retaining means to act as a spacer.

10. A level wind mechanism for fishing reels comprising, in combination: a threaded shaft; a carriage slidably supported by said shaft and movable parallel to the shaft axis; a plurality of separate pawl members; said carriage being shaped to house all said pawl members with one pawl member only in operative engagement with said shaft; and retaining means for said pawls, removable to permit interchanging said pawls, said inactive pawl being positioned between the active pawl and said retaining means to act as a spacer; said pawls having thread-engaging blades; said spacer pawl having its blade extending in a direction coaxial with the blade of said active pawl.

11. A level wind mechanism for fishing reels comprising, in combination: a threaded shaft; a carriage slidably supported by said shaft and movable parallel to the shaft axis; a plurality of separate pawl members; said carriage being shaped to house all said pawl members with one pawl member only in operative engagement with said shaft; and retaining means for said pawls, removable to permit interchanging said pawls, said inactive pawl being positioned between the active pawl and said retaining means to act as a spacer; said pawls having thread-engaging blades; said spacer pawl having its blade extending in a direction coaxial with but opposite to the blade of said active pawl.

12. A level wind mechanism for fishing reels comprising, in combination: a threaded shaft; a carriage slidably supported by said shaft and movable parallel to the shaft axis; a plurality of separate pawl members; said carriage being shaped to house all said pawl members with one pawl member only in operative engagement with said shaft; and retaining means for said pawls, removable to permit interchanging said pawls, said inactive pawl being positioned between the active pawl and said retaining means to act as a spacer; said pawls having thread-engaging blades; said spacer pawl having its blade extending in a direction coaxial with but opposite to the blade of said active pawl; said spacer pawl being shaped to provide a pivotal abutment for the active pawl, permitting said active pawl to rotate relative to said spacer pawl.

13. A level wind mechanism for fishing reels comprising, in combination: a threaded shaft; a carriage slidably supported by said shaft and movable parallel to the shaft axis; a plurality of separate pawl members; said carriage being shaped to house all said pawl members with one pawl member only in operative engagement with said shaft; and retaining means for said pawls, removable to permit interchanging said pawls, said inactive pawl being positioned between the active pawl and said retaining means to act as a spacer; said pawls having thread-engaging blades; said spacer pawl having its blade extending in a direction coaxial with but opposite to the blade of said active pawl; the abutting ends of said pawls being shaped to have contact over part of their area adjacent their common axis, whereby the inactive pawl provides for the active pawl a pivotal abutment with minimum friction.

JOHN V. SCHAFER.